United States Patent
Hong et al.

(10) Patent No.: US 8,704,899 B2
(45) Date of Patent: Apr. 22, 2014

(54) DIGITAL PHOTOGRAPHING APPARATUS AND METHOD FOR LIVE VIEW OPTICAL IMAGE STABILIZATION

(75) Inventors: Min-suk Hong, Suwon-si (KR); Sung Park, Suwon-si (KR); Cheol-hee Choi, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 372 days.

(21) Appl. No.: 13/151,395

(22) Filed: Jun. 2, 2011

(65) Prior Publication Data

US 2012/0026347 A1 Feb. 2, 2012

(30) Foreign Application Priority Data

Jul. 28, 2010 (KR) ........................ 10-2010-0072977

(51) Int. Cl.
*H04N 5/228* (2006.01)

(52) U.S. Cl.
USPC .................................................... 348/208.11

(58) Field of Classification Search
USPC ........ 348/208.99, 208.2, 208.3, 208.4, 208.7, 348/208.11
See application file for complete search history.

(56) References Cited

U.S. PATENT DOCUMENTS

| | | | | |
|---|---|---|---|---|
| 5,615,397 | A * | 3/1997 | Shiomi et al. | 396/55 |
| 5,937,214 | A * | 8/1999 | Shintani et al. | 396/55 |
| 6,067,420 | A * | 5/2000 | Hara et al. | 396/55 |
| 6,630,950 | B1 * | 10/2003 | Ohkawara et al. | 348/208.12 |
| 6,778,768 | B2 * | 8/2004 | Ohkawara et al. | 396/55 |
| 7,106,363 | B2 * | 9/2006 | Ishikawa et al. | 348/208.11 |
| 7,548,257 | B2 * | 6/2009 | Ito et al. | 348/208.7 |
| 7,719,225 | B2 * | 5/2010 | Nomura et al. | 318/685 |
| 7,889,237 | B2 * | 2/2011 | Okumura | 348/208.5 |
| 8,023,809 | B2 * | 9/2011 | Washisu et al. | 396/55 |
| 2002/0196347 | A1 * | 12/2002 | Ishikawa et al. | 348/208.5 |
| 2005/0057661 | A1 * | 3/2005 | Tanaka | 348/208.99 |
| 2008/0151062 | A1 * | 6/2008 | Okumura | 348/208.1 |
| 2008/0151065 | A1 * | 6/2008 | Okumura et al. | 348/208.4 |
| 2009/0160948 | A1 * | 6/2009 | Tabuchi | 348/208.2 |
| 2009/0160953 | A1 * | 6/2009 | Nagata et al. | 348/208.6 |
| 2010/0013937 | A1 * | 1/2010 | Washisu et al. | 348/208.2 |

* cited by examiner

*Primary Examiner* — Nicholas Giles
(74) *Attorney, Agent, or Firm* — Drinker Biddle & Reath LLP

(57) ABSTRACT

A digital photographing apparatus includes an optical system, an optical image stabilization (OIS) unit adapted to move the optical system, and a digital signal processor in communication with the OIS unit. The digital signal processor sets an operating ratio of the OIS unit by reducing the operating ratio to a previously set value of 100% or below after a still image or a moving picture is captured, and the OIS unit moves the optical system while a live view mode is turned on.

20 Claims, 6 Drawing Sheets

DIGITAL PHOTOGRAPHING APPARATUS AND METHOD FOR LIVE VIEW OPTICAL IMAGE STABILIZATION

CROSS-REFERENCE TO RELATED PATENT APPLICATION

This application claims the priority benefit of Korean Patent Application No. 10-2010-0072977, filed on Jul. 28, 2010, in the Korean Intellectual Property Office, the entire disclosure of which is incorporated herein by reference.

BACKGROUND

1. Field of the Invention

Embodiments relate to a hand tremble correction method, and more particularly, to optical image stabilization (OIS).

2. Description of the Related Art

Digital photographing apparatuses process an image received through an imaging device in a digital signal processor. Digital photographing apparatuses can then compress the processed image to generate an image file and store the generated image file in a memory. Also, digital photographing apparatuses may display an image received through an imaging device or stored in a storage medium on a liquid crystal display (LCD).

When a user captures a desired image using a digital photographing apparatus, such as a camera, the digital photographing apparatus may be shaken due to a trembling of the hand of the user. Thus, the image received through the imaging device is shaken, and the photographing may not be satisfactorily performed. A digital photographing apparatus may include a function that corrects for the trembling of the hand in order to more reliably perform photographing.

SUMMARY

Embodiments include a method of applying an optical image stabilization (OIS) function so that vibration or operational noise of hardware occurring while applying OIS is prevented.

Embodiments also include a method of correcting a hand tremble by moving an OIS mechanism while a live view mode is turned on.

According to an embodiment, there is provided a digital photographing apparatus. The apparatus includes an optical system, an optical image stabilization (OIS) unit adapted to move the optical system, and a digital signal processor in communication with the OIS unit. The digital signal processor sets an operating ratio of the OIS unit by reducing the operating ratio to a previously set value of 100% or below after a still image or a moving picture is captured, and the OIS unit moves the optical system while a live view mode is turned on.

The digital signal processor may set the operating ratio of the OIS unit to the previously set value by sequentially reducing the operating ratio.

The OIS unit may move the optical system of the digital photographing apparatus while the live view mode is turned on after a previously set delay time has passed.

The digital signal processor may initialize variables related to the OIS unit after the operating ratio of the OIS unit is set to the previously set value.

The variables related to the OIS unit can include a current location value of a gyro sensor and a current location value of a hall sensor.

An OIS limiter may be driven after the variables related to the OIS unit are initialized.

The OIS unit may drive the OIS limiter when a shutter-release button of the digital photographing apparatus is half-pressed.

The OIS limiter can include at least one of a hall sensor limiter and a gyro sensor limiter.

The optical system can include a zoom lens (ZL), a focus lens (FL), a correction lens (CL), and a filter.

According to another embodiment, a digital photographing apparatus includes an optical system, an optical image stabilization (OIS) unit adapted to move the optical system, and a digital signal processor in communication with the OIS unit. The digital signal processor sets an operating ratio of the OIS unit by sequentially reducing the operating ratio to a previously set value of 100% of below after a still image or a moving picture is captured, and the OIS unit moves the optical system while a live view mode is turned on and the digital signal processor initializes variables related to the OIS unit after the operating ratio of the OIS unit is set to the previously set value.

An OIS limiter may be driven after the variables related to the OIS unit are initialized and the variables related to the OIS unit can include a current location value of a gyro sensor and a current location value of a hall sensor.

According to another embodiment, there is provided a method of operating a digital photographing apparatus. The method includes setting an operating ratio of an optical image stabilization (OIS) unit in a digital signal processor of the digital photographing apparatus by reducing the operating ratio to a previously set value of 100% or below after a still image or a moving picture is captured and moving an optical system of the digital photographing apparatus using the OIS unit while a live view mode is turned on.

The reducing the operating ratio can include sequentially reducing the operating ratio to the previously set value.

The moving the optical system can include moving the optical system while the live view mode is turned on after a previously set delay time has passed.

The method may further include initializing variables related to the OIS unit in the digital signal processor after the operating ratio of the OIS unit is set to the previously set value.

The variables related to the OIS unit can include a current location value of a gyro sensor and a current location value of a hall sensor.

The method may further include driving an OIS limiter after the initializing of the variables related to the OIS unit.

The optical system can include a zoom lens (ZL), a focus lens (FL), a correction lens (CL), and a filter.

According to another embodiment, a method of operating a digital photographing apparatus includes setting an operating ratio of an optical image stabilization (OIS) unit in a digital signal processor of the digital photographing apparatus by sequentially reducing the operating ratio to a previously set value of 100% or below after a still image or a moving picture is captured, moving an optical system of the digital photographing apparatus using the OIS unit while a live view mode is turned on, and initializing variables related to the OIS unit after the operating ratio of the OIS unit is set to the previously set value in the digital signal processor.

The method may further include driving an OIS limiter after the variables related to the OIS unit are initialized in the digital signal processor and the variables related to the OIS unit comprise a current location value of a gyro sensor and a current location value of a hall sensor.

BRIEF DESCRIPTION OF THE DRAWINGS

The above and other features and advantages will become more apparent by describing in detail exemplary embodiments with reference to the attached drawings in which.

DETAILED DESCRIPTION

Hereinafter, embodiments will be described in detail with reference to the accompanying drawings.

An example of a function that corrects for the trembling of the hand used in a digital photographing apparatus may be an optical image stabilization (OIS) function. According to the OIS function, a hand tremble estimate vector is extracted by using a gyro sensor, and then hardware of an optical system is moved beforehand based on the extracted hand tremble estimate vector.

In general, hardware is moved to a previously set starting point according to the OIS function immediately after a still image or a moving picture is captured while a live view mode is turned on. Thus, advance preparations for capturing a still image or a moving picture are accomplished.

For example, a location of a lens is moved to an upper side of an X-axis and on the center of a Y-axis before opening a shutter, and then when the shutter is opened, by using the OIS function, the location of the lens is moved onto the X-axis while remaining on the Y-axis while the live view mode is turned on. Thus, advance preparations for photographing are accomplished.

However, in such a method, an image may be captured while the lens is not at the previously set starting point (for example, at the centers of the X and Y axes). While the live view mode is turned on, a user may not view movement of an image on an LCD. However, since the lens suddenly moves to the previously set starting point, such as the center, a crashing sound may be generated, and a slight vibration may occur in the lens.

According to an embodiment, unlike general hand tremble correction performed by using an OIS function while a live view mode is turned on, a method of preparing advanced preparations for capturing a following still image or moving picture by using an OIS function while a live view mode is turned on is provided.

According to another embodiment, problems occurring when a lens suddenly moves to a previously set starting point by using an OIS function are solved.

Figure 1:
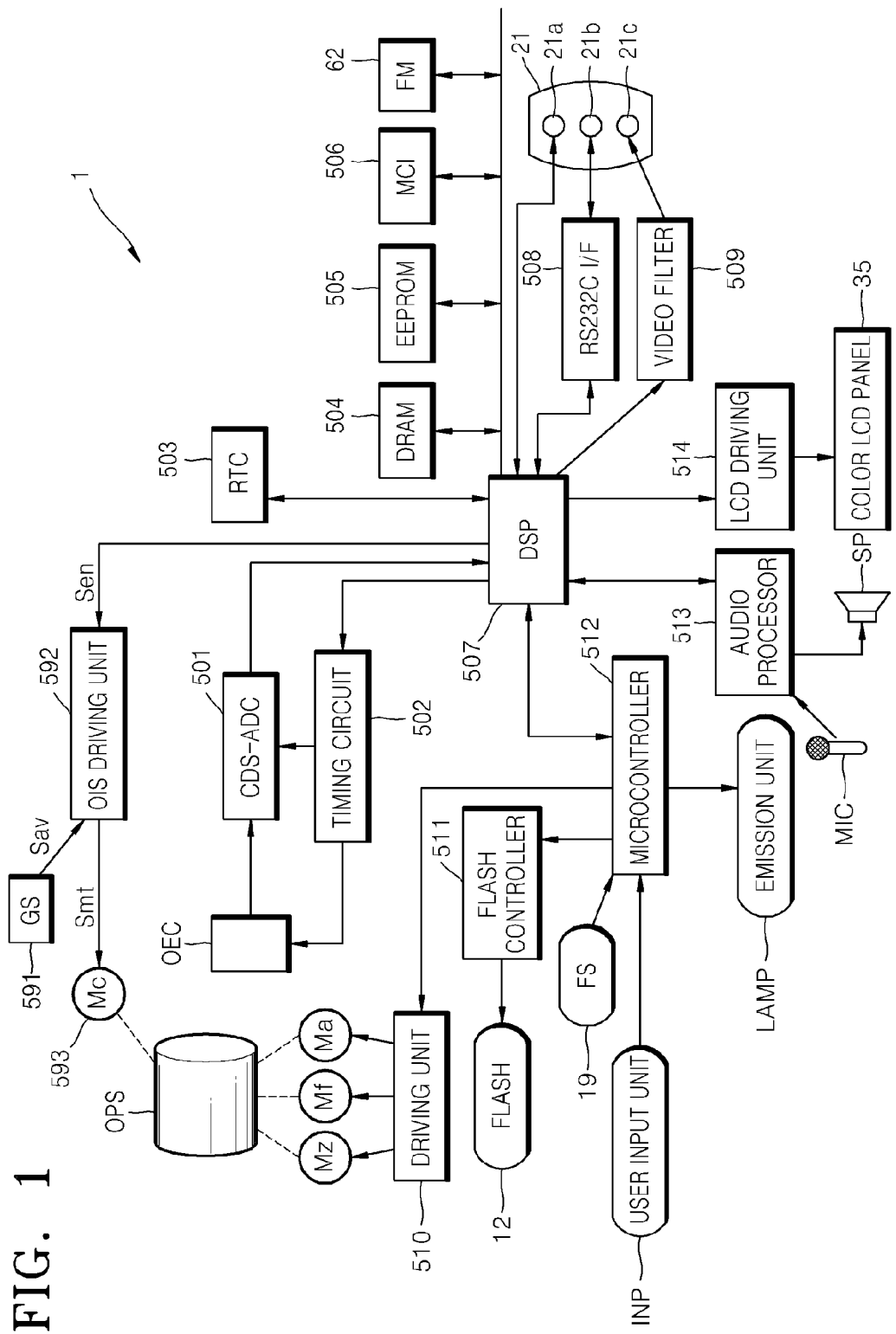
FIG. 1 is a block diagram of a digital photographing apparatus that adopts a hand tremble correction method, according to an embodiment.
Figure 2:
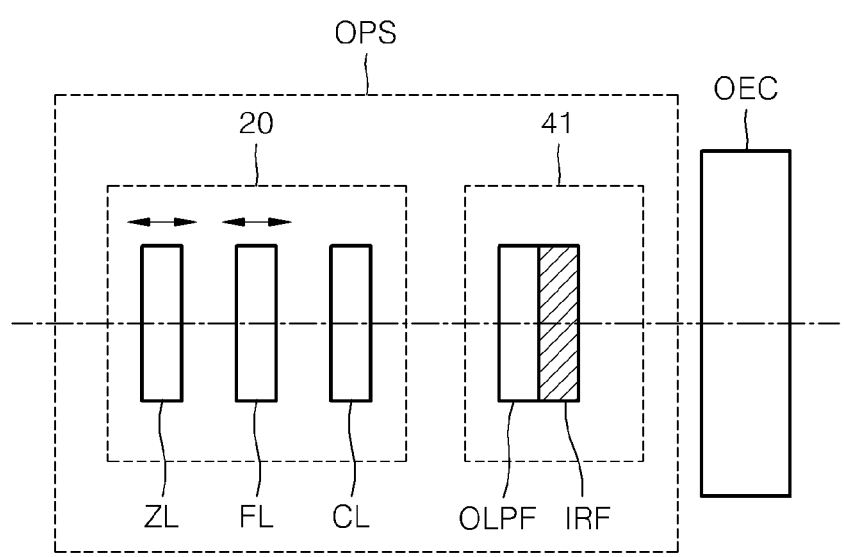
FIG. 2 illustrates an incident side of the digital photographing apparatus of FIG. 1.

FIG. 1 is a block diagram of a digital photographing apparatus 1 that adopts an OIS function, according to an embodiment, and FIG. 2 illustrates an incident side of the digital photographing apparatus 1 of FIG. 1. Referring to FIGS. 1 and 2, structures and operations of the digital photographing apparatus 1 of FIG. 1 may be described as follows.

An optical system (OPS) can include a lens unit 20 and a filter unit 41 that optically processes light from a subject. The lens unit 20 of the OPS can include a zoom lens (ZL), a focus lens (FL), and a correction lens (CL). When a user presses a zoom button that can be included in a user input unit (INP), a corresponding signal can be inputted to a microcontroller 512. The zoom button may be pressed in a live-view mode or a moving picture photographing mode. Accordingly, the microcontroller 512 can control a driving unit 510 to drive a zoom motor (Mz) to move the ZL.

For example, when a wide angle-zoom signal is generated, a focal length of the ZL can be reduced. Thus, the viewing angle can be widened. When a telephoto-zoom signal is generated, the focal length of the ZL can be increased. Thus, the viewing angle can be narrowed. While a location of the ZL is being set, a location of the FL can be adjusted, and the viewing angle may not be affected by the location of the FL.

In an automatic focusing mode, a core process that can be included in a digital signal processor (DSP) 507 can control the driving unit 510 through the microcontroller 512 to drive a focus motor (Mf) to move the FL. The FL may move to a position where it has a maximum average brightness difference between adjacent pixels. That is, the position of the FL where the frame contrast is the greatest can be set based on a driving step count of the focus motor (Mf).

The CL of the lens unit 20 that can be included in the optical system OPS can be driven by a correction motor (Mc) 593 for the OIS function and can adjust a refractive index of incident light.

An aperture motor (Ma) can be a motor that drives an aperture (not illustrated).

The filter unit 41 of the optical system OPS can include an optical low pass filter (OLPF) and an infra-red cut filter (IRF). The OLPF can remove high-frequency optical noise. The IRF can block infrared ray components of incident light.

An optical electric converter (OEC) of a charge coupled device (CCD) or a complementary metal-oxide semiconductor (CMOS) can convert light from the OPS into an electric analog signal. The DSP 507 can control a timing circuit 502. The DSP 507 can also control operations of the OEC and an analog-digital converter 501. The analog-digital converter 501 can be a correlation double sampler and analog-to-digital converter (CDS-ADC) 501. The CDS-ADC 501 can process an analog signal from the OEC, remove high-frequency noise, adjust amplitudes, and generate digital image data.

A real-time clock (RTC) 503 can provide time information to the DSP 507. The DSP 507 can process digital image data from the CDS-ADC 501 and can generate digital image data classified by brightness and chromaticity signals.

An emission unit (LAMP) driven by the microcontroller 512 according to control signals from the DSP 507 can include a self-timer lamp or a photographing apparatus-state lamp.

A dynamic random access memory (DRAM) 504 can temporarily store digital image data from the digital signal processor 507. An electrically erasable and programmable read only memory (EEPROM) 505 can store an algorithm needed to drive the DSP 507. A user's memory card can be attached to or removed from a memory card interface (MCI) 506. A flash memory (FM) 62 can store set data needed to drive the DSP 507. A memory card can be attached to or removed from the MCI 506. The memory card can be used as a user's recording medium.

Digital image data from the DSP 507, as a main controller, can be inputted to an LCD driving unit 514, and accordingly, an image can be displayed on a display panel 35.

In an interface unit 21, digital image data from the DSP 507 may be transmitted in series communication through, for example, a universal serial bus (USB) connection unit 21a or an RS232C interface (I/F) 508 and its connection unit 21b. The digital image data may be transmitted as a video signal through a video filter 509 and a video output unit 21c.

An audio processor 513 can output a voice signal from a microphone (MIC) to the DSP 507 or a speaker (SP). The audio processor 513 can also output an audio signal from the DSP 507 to the speaker SP.

The microcontroller 512 can control an operation of a flash controller 511 according to a signal from a flash-light amount sensor 19 to drive a flash 12.

As described above, the CL of the lens unit 20, which can be included in the OPS, can be driven by the Mc 593 for the OIS function. The CL can adjust the refractive index of incident light.

An OIS unit can include a hall sensor (not illustrated), a gyro sensor (GS) 591, an OIS driving unit 592, and the Mc 593.

When the location of the FL, which can be included in the lens unit 20, is changed due to a shock, the hall sensor can output a hall sensor signal that corresponds to the changed location of the FL. The hall sensor can output a hall sensor signal corresponding to a location of a lens changed by a shock occurring during a shutter operation. In general, a hall sensor, a hall device, or a magnetic unit attached to a digital photographing apparatus 1 can measure a location of a lens or a CCD and can use the corresponding location as feedback information for hand tremble correction.

The GS 591 can generate an angular velocity signal Say according to a shake of the digital photographing apparatus 1. The GS 591 can be horizontally, vertically, or both horizontally and vertically installed to the digital photographing apparatus 1. In the OIS function, the GS 591 can be used to detect an angular velocity, and the angular velocity can indicate a shake in each direction to determine whether there is generation of a hand tremble. Then, if it is determined that a hand tremble is generated, the hand tremble can be compensated.

The DSP 507 can generate an enable signal Sen that can control an operation of the OIS driving unit 592.

When an enable command is given from the DSP 507, the OIS driving unit 592 can detect the location of the FL using the hall sensor and a hand tremble estimate vector according to the angular velocity signal Say from the GS 591. The OIS driving unit can drive the Mc 593 in correspondence to the detected hand tremble estimate vector.

The Mc 593, which may be replaced with an actuator, can be driven according to a driving signal Smt from the OIS driving unit 592. The Mc 593 can adjust a direction of the CL, which can be included in the lens unit 20 of the OPS.

Figure 3:
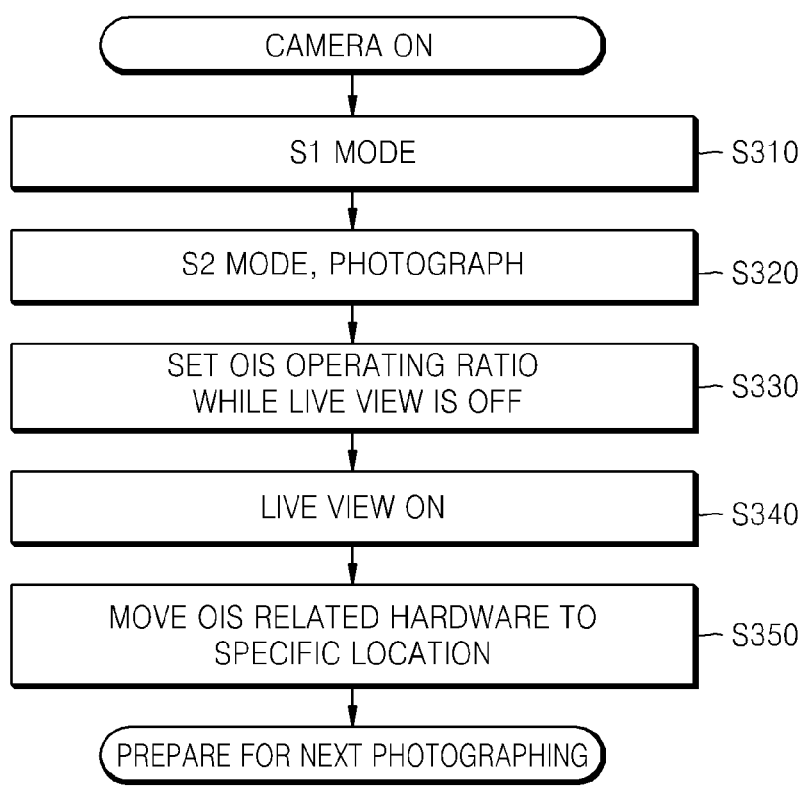
FIG. 3 is a flowchart illustrating a method of applying an optical image stabilization (OIS) function, according to an embodiment.
Figure 4:
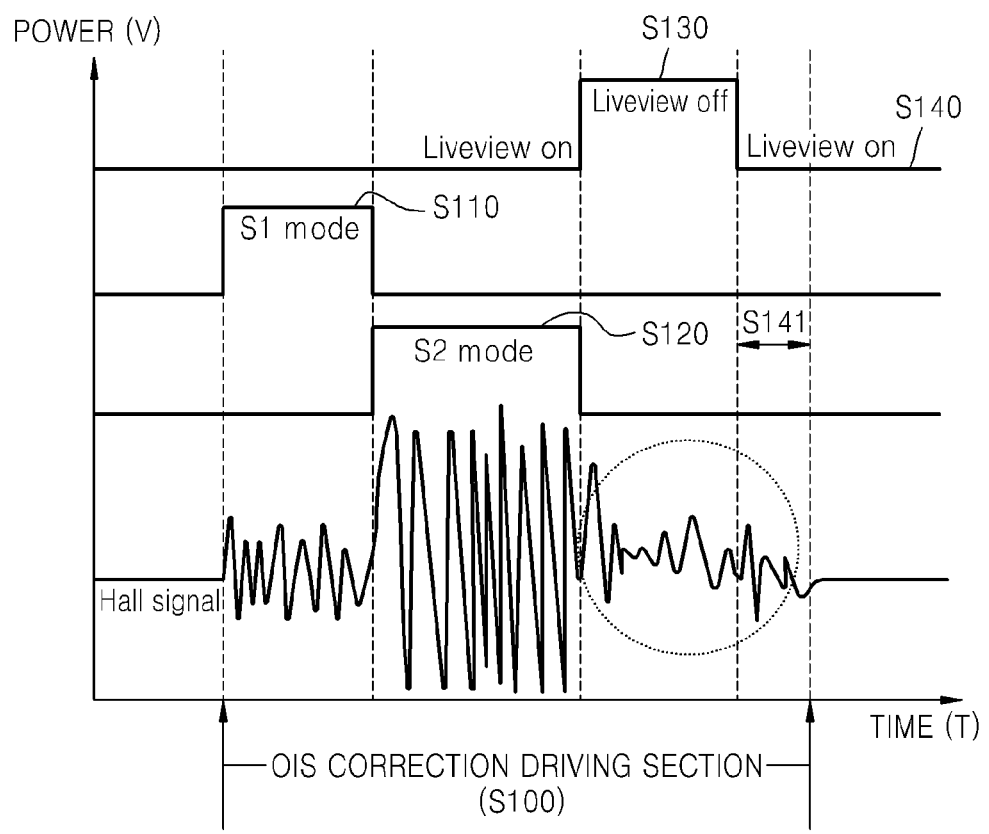
FIG. 4 illustrates an exemplary embodiment in which the method of FIG. 3 is performed using the digital photographing apparatus of FIG. 1.

FIG. 3 is a flowchart illustrating a method of applying the OIS function, according to an embodiment, and FIG. 4 illustrates an exemplary embodiment in which the method of FIG. 3 is performed using the digital photographing apparatus 1 of FIG. 1.

Referring to FIGS. 3 and 4, the digital photographing apparatus 1 can be maintained in a standby mode after the digital photographing apparatus 1 has been turned on but before capturing of an image. A hand tremble correction function can be performed when, for example, a user half-presses a shutter-release button, in operation S100 of FIG. 4.

When a user half-presses the shutter-release button so as to operate an S1 mode, the digital photographing apparatus 1 can perform an auto focus (AF) operation, in operation S310 and in operation S110 of FIG. 4. In the S1 mode, the hall sensor and the GS 591 may be controlled by using OIS limiters. Examples of the OIS limiters include a hall sensor limiter, a gyro sensor limiter, and the like.

Then, when a subject image is in focus, the shutter-release button may be fully pressed and an S2 mode can be operated, in operation S320 of FIG. 3 and in operation S120 of FIG. 4.

In the S2 mode, after a still image or a moving picture is captured, an operating ratio of the OIS unit (not illustrated) can be reset to a previously set specific value of 100% or below during a section where the live view mode is turned off, in operation S330 of FIG. 3 and in operation S130 of FIG. 4. When the DSP 507 of FIG. 1 receives a signal indicating that photographing is completed, the operating ratio of the OIS unit can be reset to the previously set specific value.

When the operating ratio of the OIS unit is reduced, variations sensed by the hall sensor and the GS 591 can be reduced, and thus a driving amount of a correction mode can also be reduced. In this regard, even if the live view is turned on, a user may hardly sense a shake of an image due to movement of the lens unit 20.

For example, when the operating ratio of the OIS unit is changed to a previously set specific value other than 100% (for example, 80%), variations sensed by the hall sensor and the GS 591 can be reduced and thereby a driving amount of the OPS including the lens unit 20 and the like can also be reduced.

After the live view mode is turned on, in operation S140 of FIG. 4, the OIS driving unit 592 of FIG. 1 may drive the Mc 593 according to the location of the FL detected using the hall sensor and the angular velocity signal Say generated by the GS 591. The OIS driving unit 592 can move the OPS including the lens unit 20 and the like to a previously set specific location, in operation S350 of FIG. 3. When a specific delay time has passed while the live view mode is turned on, in operation S141 of FIG. 4, hardware of the OPS can be returned to an initially set location, and the next photographing can be prepared.

Due to the reduction in the operating ratio of the OIS unit in the DSP 507 of FIG. 1, variations sensed by the hall sensor and the GS 591 can be reduced and thus a driving amount of the Mc 593 can also be reduced.

Figure 5:
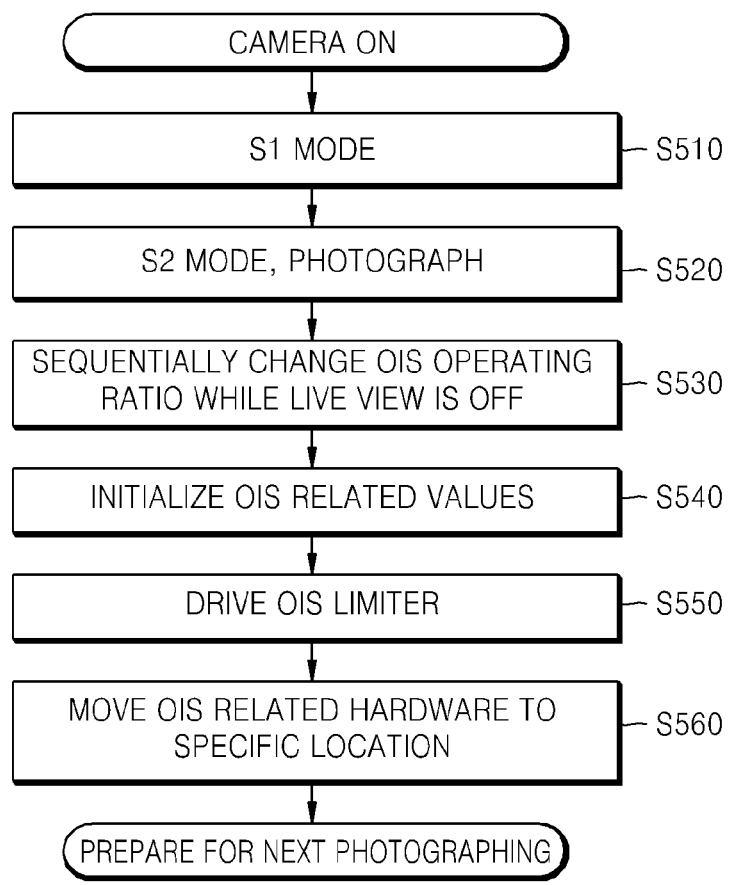
FIG. 5 is a flowchart illustrating a method of applying an OIS function, according to another embodiment.
Figure 6:
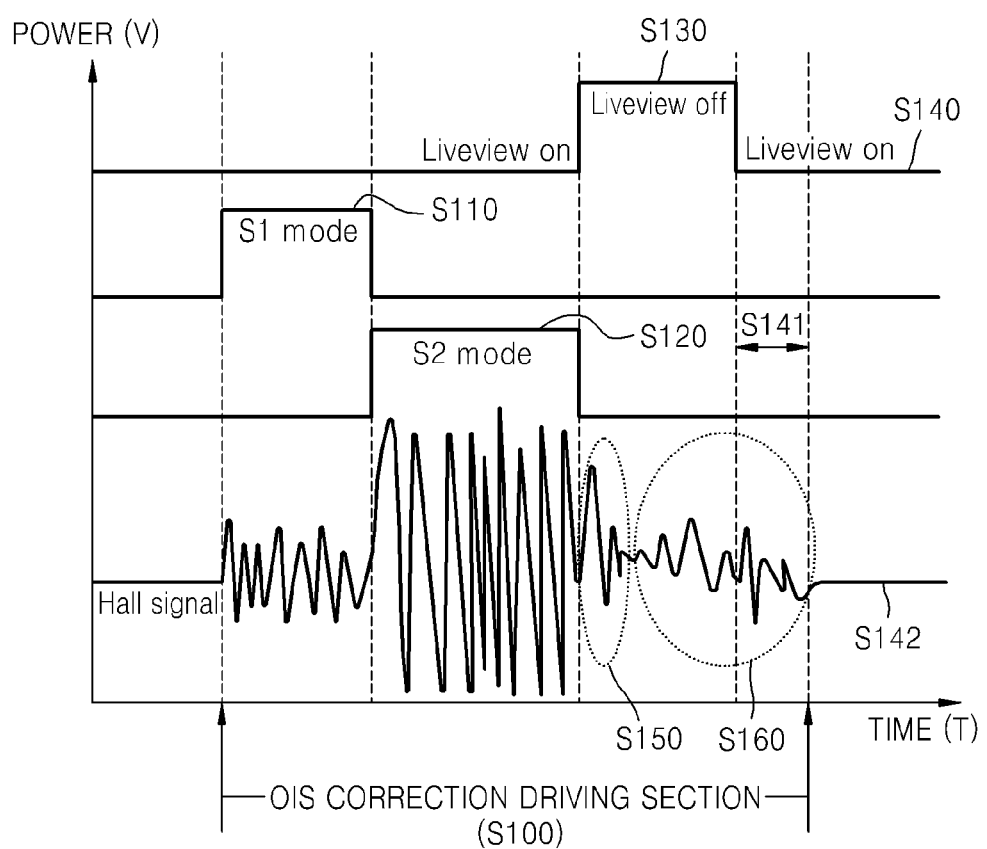
FIG. 6 illustrates an exemplary embodiment in which the method of FIG. 5 is performed using the digital photographing apparatus of FIG. 1.

FIG. 5 is a flowchart illustrating a method of applying an OIS function, according to another embodiment, and FIG. 6 illustrates an exemplary embodiment in which the method of FIG. 5 is performed using the digital photographing apparatus 1 of FIG. 1. Referring to FIGS. 5 and 6, the OIS function may be applied to the digital photographing apparatus 1 as follows.

The method of applying the OIS function to the digital photographing apparatus 1 according to the embodiment of FIG. 5 is similar to that of FIG. 3, and thus detailed descriptions may not be repeated.

In the S2 mode, after a still image or a moving picture is captured, the DSP 507 of FIG. 1 can sequentially reset the operating ratio of the OIS unit (not illustrated) to the previously set specific value of 100% or below during a section where the live view mode is turned off, in operation S130 of FIG. 6. For example, when the previously set specific value is set to 80%, the operating ratio of the OIS unit can be sequentially changed to 100%, 95%, 90%, 85%, and 80% in this order.

Then, when the operating ratio of the OIS unit reaches the previously set specific value, values relating to the OIS unit or that may affect the OIS unit can be initialized. Examples of the values relating to the OIS unit or that may affect the OIS unit may include OIS Venus engine (for example, LSI), a current location value of a gyro sensor, a current location value of a hall sensor, and the like.

When the DSP 507 of FIG. 1 receives a signal (for example, an S2 mode OFF signal) indicating that photographing is completed, the operating ratio of the OIS unit can be sequentially reduced and can be reset to the previously set specific value. Then, the values relating to the OIS unit or that may affect the OIS unit can be initialized in the DSP 507 of FIG. 1. For example, the DSP 507 of FIG. 1 can reset a current location value of a gyro sensor and a current location value of a hall sensor stored in a RAM to initialized values.

Also, the OIS limiters may be selectively driven before the live view mode is turned on, in operation S550 of FIG. 5 and in operation S140 of FIG. 6.

Then, when the live view mode is turned on, in operation S140 of FIG. 6, the OIS driving unit 592 of FIG. 1 can move the OPS to the previously set specific location by using OIS, in operation S560 of FIG. 5. Accordingly, a blurring effect occurring due to a hand tremble may be prevented.

Next, after the specific delay time has passed while the live view mode is turned on, in operation S141 of FIG. 6, the hardware of the OPS may be returned to the initially set location, in operation S560 of FIG. 5. While the specific delay time is passing, in operation S141 of FIG. 6, a tremble of the hardware driven in the OIS driving unit may be stabilized, in operation S142 of FIG. 6. Then, next photographing can be prepared.

According to the embodiments, after a still image or a moving picture is captured in a digital photographing apparatus, OIS related hardware can be moved to a specific location while a live view mode is turned on, and thus a user may view a screen being moved on an LCD. Also, an OIS operating ratio can be changed so that, even if a user views an LCD, the user may hardly sense a hand tremble.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media, random-access memory (RAM), read-only memory (ROM), CD-ROMs, DVDs, magnetic tapes, hard disks, floppy disks, and optical data storage devices. This media can be read by the computer, stored in the memory, and executed by the processor.

Programs for executing the method according to the embodiments in a camera system may be stored in a recording medium. The recording medium may be a memory or other separate recording medium. Examples of the recording medium may include storage media such as magnetic storage media (for example, hard disks) and optical recording media (for example, CD-ROMs, or DVDs).

Also, using the disclosure herein, programmers of ordinary skill in the art to which the invention pertains can easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein can be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

What is claimed is:

1. A digital photographing apparatus, the apparatus comprising:
an optical system;
an optical image stabilization (OIS) unit adapted to move the optical system; and
a digital signal processor in communication with the OIS unit, wherein the digital signal processor sets an operating ratio of the OIS unit by reducing the operating ratio to a previously set value after a still image or a moving picture is captured,
wherein the OIS unit moves the optical system with the previously set value of the operating ratio while a live view mode is turned on.

2. The apparatus of claim 1, wherein the digital signal processor sets the operating ratio of the OIS unit to the previously set value by sequentially reducing the operating ratio.

3. The apparatus of claim 1, wherein the OIS unit moves the optical system of the digital photographing apparatus while the live view mode is turned on after a previously set delay time has passed.

4. The apparatus of claim 1, wherein the digital signal processor initializes variables related to the OIS unit after the operating ratio of the OIS unit is set to the previously set value.

5. The apparatus of claim 4, wherein the variables related to the OIS unit comprise a current location value of a gyro sensor and a current location value of a hall sensor.

6. The apparatus of claim 4, wherein an OIS limiter is driven after the variables related to the OIS unit are initialized.

7. The apparatus of claim 6, wherein the OIS unit drives the OIS limiter when a shutter-release button of the digital photographing apparatus is half-pressed.

8. The apparatus of claim 6, wherein the OIS limiter comprises at least one of a hall sensor limiter and a gyro sensor limiter.

9. The apparatus of claim 1, wherein the optical system comprises a zoom lens (ZL), a focus lens (FL), a correction lens (CL), and a filter.

10. A digital photographing apparatus, the apparatus comprising:
an optical system;
an optical image stabilization (OIS) unit adapted to move the optical system; and
a digital signal processor in communication with the OIS unit, the digital signal processor setting an operating ratio of the OIS unit by sequentially reducing the operating ratio to a previously set value after a still image or a moving picture is captured,
wherein the OIS unit moves the optical system while a live view mode is turned on and the digital signal processor initializes variables related to the OIS unit after the operating ratio of the OIS unit is set to the previously set value.

11. The apparatus of claim 10, wherein an OIS limiter is driven after the variables related to the OIS unit are initialized and the variables related to the OIS unit comprise a current location value of a gyro sensor and a current location value of a hall sensor.

12. A method of operating a digital photographing apparatus, the method comprising:
setting an operating ratio of an optical image stabilization (OIS) unit in a digital signal processor of the digital photographing apparatus by reducing the operating ratio to a previously set value after a still image or a moving picture is captured; and
moving an optical system of the digital photographing apparatus using the OIS unit with the previously set value of the operating ratio while a live view mode is turned on.

13. The method of claim 12, wherein the setting the operating ratio comprises sequentially reducing the operating ratio to the previously set value.

14. The method of claim 12, wherein the moving the optical system comprises moving the optical system while the live view mode is turned on after a previously set delay time has passed.

15. The method of claim 12, further comprising initializing variables related to the OIS unit in the digital signal processor after the operating ratio of the OIS unit is set to the previously set value.

16. The method of claim 15, wherein the variables related to the OIS unit comprise a current location value of a gyro sensor and a current location value of a hall sensor.

17. The method of claim 15, further comprising driving an OIS limiter after the initializing of the variables related to the OIS unit.

18. The method of claim 12, wherein the optical system comprises a zoom lens (ZL), a focus lens (FL), a correction lens (CL), and a filter.

19. A method of operating a digital photographing apparatus, the method comprising:
setting an operating ratio of an optical image stabilization (OIS) unit in a digital signal processor of the digital photographing apparatus by sequentially reducing the operating ratio to a previously set value after a still image or a moving picture is captured;
moving an optical system of the digital photographing apparatus using the OIS unit with the previously set value of the operating ratio while a live view mode is turned on; and
initializing variables related to the OIS unit after the operating ratio of the OIS unit is set to the previously set value in the digital signal processor.

20. The method of claim 19, further comprising driving an OIS limiter after the variables related to the OIS unit are initialized in the digital signal processor and the variables related to the OIS unit comprise a current location value of a gyro sensor and a current location value of a hall sensor.

* * * * *